S. B. SVENDSEN.
WEEDER.
APPLICATION FILED OCT. 5, 1916.
1,239,316.
Patented Sept. 4, 1917.
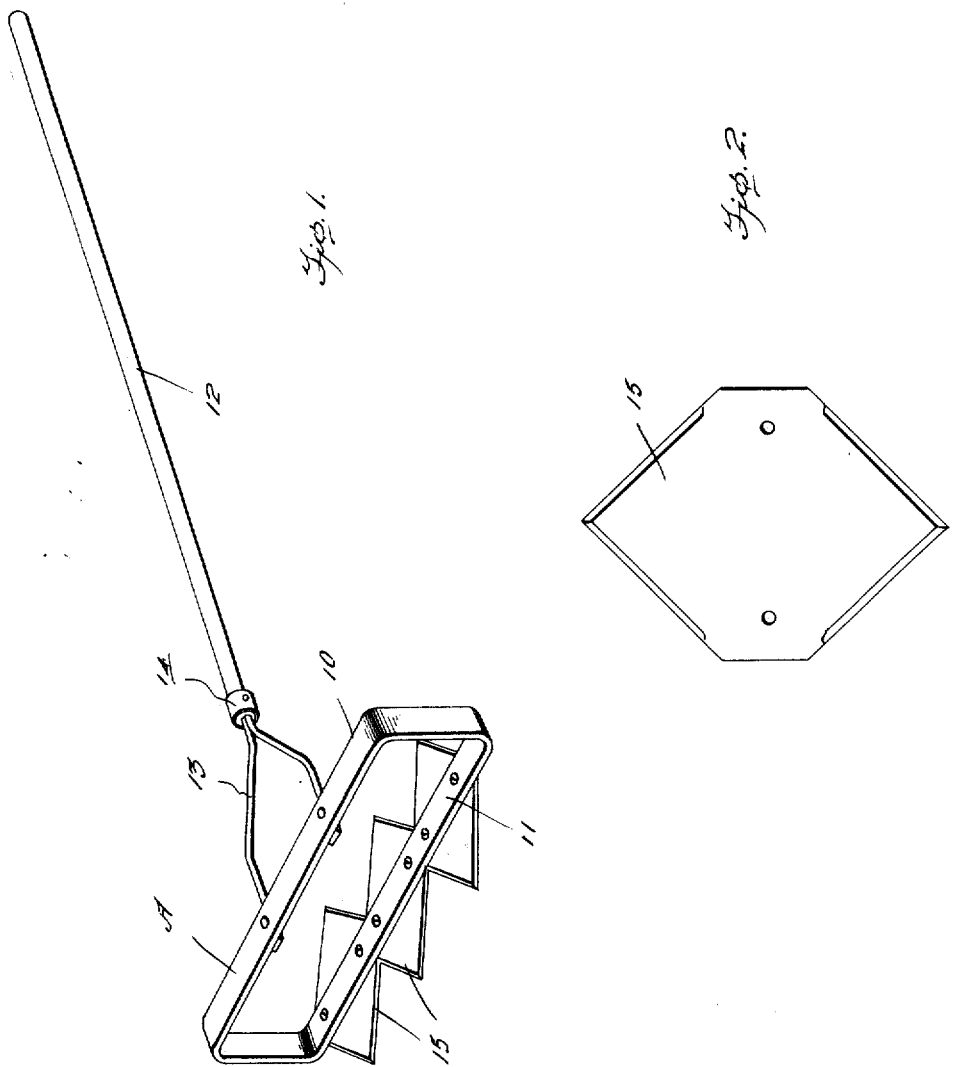
Inventor
S. B. Svendsen.
By John Louis Waters
Attorney

UNITED STATES PATENT OFFICE.

SEVERIN B. SVENDSEN, OF ESPANOLA, FLORIDA.

WEEDER.

1,239,316.　　　　　Specification of Letters Patent.　　　Patented Sept. 4, 1917.

Application filed October 5, 1916. Serial No. 123,880.

*To all whom it may concern:*

Be it known that I, SEVERIN B. SVENDSEN, a citizen of the United States, residing at Espanola, in the county of St. Johns and State of Florida, have invented certain useful Improvements in Weeders, of which the following is a specification, reference being had therein to the accompanying drawing.

This invention relates to agricultural implements, and has particular reference to a weeder.

The invention aims to provide a device of the above mentioned character, wherein the cutting elements are designed and arranged to be adapted for their purpose when the device is moved either in a forward or backward direction, thus permitting a large quantity of work to be accomplished in a comparatively short time.

The nature and scope of the invention will be better understood when the following description is taken in consideration with the accompanying drawing, the invention residing in the construction, combination and arrangement of parts as claimed.

In the drawing forming part of this specification similar reference characters indicate similar parts in the several views and wherein:—

Figure 1 is a perspective view.

Fig. 2 is a view of one of the blades.

The device forming the subject matter of my invention embodies an elongated frame A preferably constructed from an iron strap or other suitable material into loop form to provide spaced parallel portions 10 and 11 respectively. The frame is connected to a handle 12 preferably constructed from wood, through the instrumentality of a metallic yoke 13, the terminals of the yoke being riveted or otherwise secured to the parallel portion 10 of the frame, while the intermediate portion of the yoke is received within an opening in the adjacent end of the handle. A reinforcing band 14 surrounds the handle at its point of connection with the yoke 13.

A plurality of cutting elements or blades 15 are secured to the under side of the parallel portion 11 of the frame, and while the blades may be associated with the frame in any suitable manner, I preferably make use of screws or other suitable fastening elements to permit the blades to be readily detached from the frame when it is desired to sharpen the same or for any other purpose. The blades are preferably of diamond formation and project beyond the opposite longitudinal edges of the portion 11 of the frame, so that by swinging or moving the device forwardly or rearwardly the blades become effective for their purpose, or in other words cut in both directions. Manifestly with a device constructed in accordance with my invention a maximum amount of work can be accomplished in a minimum of time, while the same can be conveniently handled and accomplish its purpose without doing injury to roots or young crops.

What is claimed is:—

A device of the class described embodying a loop-like frame having parallel portions, a handle connected to one of said portions, and a plurality of angular blades secured to the other of said parallel portions, each blade having a portion projecting beyond the opposite sides of the frame and having its edges sharpened for the purpose set forth.

In testimony whereof I affix my signature.

SEVERIN B. SVENDSEN.